United States Patent
Collins et al.

(10) Patent No.: US 9,536,259 B2
(45) Date of Patent: Jan. 3, 2017

(54) ENTITY-BASED SEARCHING WITH CONTENT SELECTION

(71) Applicant: Google Inc., Mountain View, CA (US)

(72) Inventors: Alexander Collins, San Francisco, CA (US); Ian James Leader, Zurich (CH); Yunkai Zhou, Sewickley, PA (US)

(73) Assignee: Google Inc., Mountain View, CA (US)

( * ) Notice: Subject to any disclaimer, the term of this patent is extended or adjusted under 35 U.S.C. 154(b) by 582 days.

(21) Appl. No.: 13/786,243

(22) Filed: Mar. 5, 2013

(65) Prior Publication Data

US 2014/0258013 A1    Sep. 11, 2014

(51) Int. Cl.
    *G06Q 30/00* (2012.01)
    *G06Q 30/06* (2012.01)
    G06Q 30/08 (2012.01)
    G06Q 30/02 (2012.01)

(52) U.S. Cl.
    CPC ...... *G06Q 30/0625* (2013.01); *G06Q 30/0255* (2013.01); *G06Q 30/0256* (2013.01); *G06Q 30/00* (2013.01); *G06Q 30/02* (2013.01); *G06Q 30/0241* (2013.01); *G06Q 30/0631* (2013.01); *G06Q 30/08* (2013.01)

(58) Field of Classification Search
    CPC .......................................... G06Q 30/00–30/08
    See application file for complete search history.

(56) References Cited

U.S. PATENT DOCUMENTS

2008/0077585 A1    3/2008  Li et al.
2010/0324993 A1   12/2010  Kacholia et al.
2012/0150657 A1*   6/2012  Rubinstein et al. ....... 705/14.66
2012/0215776 A1    8/2012  Guha et al.
2014/0172840 A1*   6/2014  Kumar .............. G06F 17/30867
                                                   707/723

FOREIGN PATENT DOCUMENTS

KR    10-2007-0092763 A    9/2007
KR    10-2011-0027784 A    3/2011

OTHER PUBLICATIONS

Lin, Thomas et al. "Active Objects: Actions for Entity-Centric Search", International World Wide Web Conference Committee, WWW 2012—Session : Leveraging User Actions in Search, Apr. 16-20, 2012, Lyon, France, 10 pages. Cited and provided in commonly-owned U.S. Appl. No. 13/786,256.*
International Search Report and Written Opinion mailed Jun. 23, 2014 in PCT Application No. PCT/US2014/019456.

* cited by examiner

*Primary Examiner* — Michael Misiaszek
(74) *Attorney, Agent, or Firm* — Foley & Lardner LLP; John D. Lanza

(57) ABSTRACT

Systems and methods for entity-based searching with content selection include receiving a search query and determining that the search query corresponds to a search entity. The search entity may be associated with an online action, thereby forming an entity-action pair. Auction parameters that specify the entity-action pair may be used to select third-party content. A visual layout for the third-party content may be generated based on the relationship between a search query and the entity-action pair and used as part of the presentation of the third-party content on a search result screen.

18 Claims, 6 Drawing Sheets

ENTITY-BASED SEARCHING WITH CONTENT SELECTION

BACKGROUND

Online content may be available regarding any number of disparate topics. For example, a first website on the Internet may be devoted to the migratory habits of bats and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

In general, a search engine may operate by matching keywords in a search query to keywords found on various webpages. For example, a search query for "automotive repair" may yield links to websites that contain the phrase "automotive repair." The search results may also be ranked according to relevancy, such as by the frequency of the phrase appearing on the webpages. Since a search is keyword driven, different keywords may yield different search results, even if the underlying intent of the user is the same. For example, a search query for "home automotive repair" can yield different search results than a search query for "home mechanic." Thus, the relevancy of search results to a user is often a function of the user's choice of search terms. It is challenging and difficult to devise new search techniques that capture the underlying intent of a user's search query.

SUMMARY

Implementations of the systems and methods for entity-based searching with content selection are described herein. One implementation is a computerized method of selecting third-party content for presentation with search results. The method includes receiving, at a processing circuit, auction parameters for a content provider, the parameters including a bid value and an entity-action pair. The entity-action pair includes an online action and a search entity corresponding to a named entity in the physical world. The method also includes receiving a search query having one or more keywords. The method further includes retrieving search results based in part on the search query. The method also includes determining a relationship between the one or more keywords of the search query and the entity-action pair. The method yet further includes conducting, by the processing circuit, a content auction using the auction parameters. The method additionally includes selecting third-party content based on a result of the content auction, the third-party content being configured to perform the online action in response to input from a user interface device. The method also includes generating a visual layout for the selected third-party content based on the relationship between the entity-action pair and the one or more keywords. The method further includes providing, by the processing circuit, the search results, the search entity, and the selected third-party content for presentation as part of a search result screen that uses the visual layout for the third-party content.

Another implementation is a system for selecting third-party content for presentation with search results. The system includes a processing circuit configured to receive auction parameters for a content provider, the parameters including a bid value and an entity-action pair. The entity-action pair includes an online action and a search entity corresponding to a named entity in the physical world. The processing circuit is also configured to receive a search query having one or more keywords and to retrieve search results based in part on the search query. The processing circuit is further configured to determine a relationship between the one or more keywords of the search query and the entity-action pair. The processing circuit is also configured to conduct a content auction using the auction parameters and to select third-party content based on a result of the content auction, the third-party content being configured to perform the online action in response to input from a user interface device. The processing circuit is yet further configured to generate a visual layout for the selected third-party content based on the relationship between the entity-action pair and the one or more keywords. The processing circuit is also configured to provide the search results, the search entity, and the selected third-party content for presentation as part of a search result screen that uses the visual layout for the third-party content.

A further implementation is a computer-readable storage medium having machine instructions stored therein, the instructions being executable by a processor to cause the processor to perform operations. The operations include receiving auction parameters for a content provider, the parameters having a bid value and an entity-action pair. The entity-action pair includes an online action and a search entity corresponding to a named entity in the physical world. The operations also include receiving a search query having one or more keywords and retrieving search results based in part on the search query. The operations further include determining a relationship between the one or more keywords of the search query and the entity-action pair. The operations also include conducting a content auction using the auction parameters and selecting third-party content based on a result of the content auction, the third-party content being configured to perform the online action in response to input from a user interface device. The operations additionally include generating a visual layout for the selected third-party content based on the relationship between the entity-action pair and the one or more keywords. The operations also include providing the search results, the search entity, and the selected third-party content for presentation as part of a search result screen that uses the visual layout for the third-party content.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
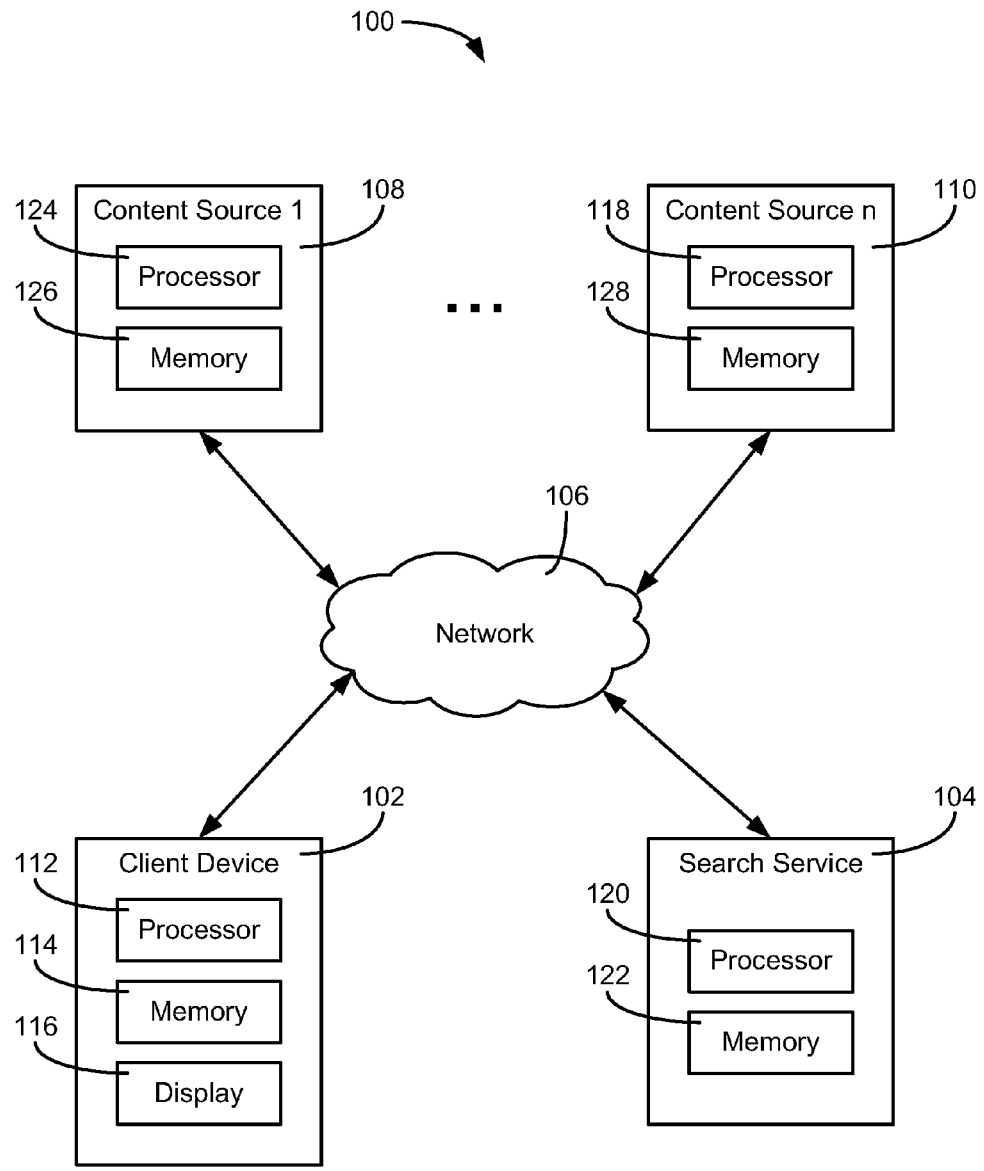
FIG. 1 is a block diagram of a computer system in accordance with described implementations.

According to some aspects of the present disclosure, a client device may receive first-party and third-party content for presentation to a user. As used herein, first-party content refers to the primary online content requested by a client device, such as a search result screen provided by a search service to the client device. For example, first-party content may be a search result webpage requested by the device or may be a screen presented as part of a stand-alone application (e.g., a navigation program, a search program, etc.). Third-party content, in contrast, refers to additional content that may be provided in conjunction with the first-party content. For example, third-party content may be a public service announcement or an advertisement that appears in conjunction with a requested webpage (e.g., a search result webpage from a search engine, a webpage that includes an online article, a webpage of a social networking service, etc.) or within a stand-alone application (e.g., an advertisement within a game, a messaging program, a navigation program, etc.). Generally, a first-party content provider refers to any content provider that allows another content provider (i.e., a third-party content provider) to provide content in conjunction with that of the first-party provider. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

According to various implementations, a first-party search service may be configured to use search entities to represent concepts that underlie search queries. Search entities may generally correspond to named entities in the physical world. For example, a search entity may correspond to a specific location, person, group of people, media content (e.g., movies, songs, etc.), or the like. In such a case, a pool of facts or other information regarding the search entity may be made available as part of search results, in addition to, or in lieu of, links to webpages regarding the entity. For example, a search query may correspond to a search entity for the Taj Mahal. Associated with the Taj Mahal search entity may be various facts about the mausoleum, such as its location, height, when it was constructed, or other such information. In some implementations, a search entity may be presented in conjunction with search results as part of a search result screen. For example, a search result webpage may include hyperlinks to webpages that match a search query as well as a search entity that corresponds to the search query (e.g., a search for the Taj Mahal may result in links to Taj Mahal-related webpages as well as the Taj Mahal search entity being displayed). In some embodiments, a search entity may be related to one or more other search entities. For example, a search entity for a particular musician may be related to search entities for his or her particular songs, albums, etc.

A first-party search service may also have one or more online actions associated with a given search entity. Such associations may be represented as entity-action pairs. In addition to general information about a particular search entity (e.g., what a user may wish to know about the search entity), the search entity may also be associated with various online actions (e.g., what the user may wish to do regarding the search entity). For example, assume that a search entity relates to a particular movie. In such a case, online actions that may be associated with the search entity may include purchasing a hardcopy of the movie (e.g., DVD, Blu-Ray, etc.) or watching the movie via streaming. Exemplary online actions may include, but are not limited to, streaming a piece of media content, making an online purchase, making reservations, purchasing tickets, or any other form of online action.

In some implementations, a first-party search service may be configured to select third-party content for presentation with search results based on an entity-action pair. For example, assume that an advertiser is selling DVD copies of a particular movie. In such a case, the advertiser may specify that they wish to place an advertisement whenever the entity-action pair including the movie entity and "purchase" online action is triggered by a search query. In various embodiments, a content auction may be held in which different third-party content providers compete for the ability to include third-party content with the search results. A third-party content provider may, for example, specify an entity-action pair on which bids are to be placed. As a result of tying auction bids to entity-action pairs instead of the search terms used, different types of advertisers are able to compete on different levels. For example, assume that a first advertiser sells DVDs, that a second advertiser operates a paid streaming service, and that the profit margin on DVD sales is much higher than when a movie is streamed. If both advertisers were to compete head-to-head, such as for the movie "Sheriff Bob," the DVD retailer is likely to always outbid the streaming service. By tying the auctions to entity-action pairs, however, the different types of advertisers may compete against other advertisers offering the same types of products or services (e.g., DVD retailers can compete head-to-head in an auction, streaming services can compete head-to-head in another auction, etc.). In other words, one content auction may be for the {Sheriff Bob, stream} entity-action pair and a separate content auction may be for the {Sheriff Bob, purchase} entity-action pair. Thus, advertisers and other third-party content providers are able to better reach users that may be interested in their products or services.

According to various implementations, the visual layout of third-party content selected for a search entity may be varied based on the relationship between a search query and an entity-action pair. Different search queries may be received that are related to the "Sheriff Bob" search entity, but may be more closely or more remotely related to a particular entity-action pair than others. For example, a search query for "Sheriff Bob streaming" may be most closely related to the {Sheriff Bob, stream} entity-action pair. In such a case, the visual layout for a link to a third-party provider's streaming service may be displayed more prominently or emphasized when presented in conjunction with the search results (e.g., placed closer to the top of the search result page, highlighted, presented using a larger font, etc.). In another example, a search query for "Sheriff Bob showtimes in Orlando" is most closely related to the {Sheriff Bob, purchase tickets} entity-action pair, since the intent underlying the query is likely to purchase movie tickets. However, such a query may still be related to the {Sheriff Bob, stream} entity-action pair, since it is still possible that the user is also interested in streaming the movie instead. In such a case, a link to the third-party provider's streaming service may still be presented in conjunction with the search results, but in such a way that conveys that its underlying entity-action pair is not as closely related to the search query (e.g., by decreasing the font of the link, positioning the link further towards the bottom of the search results page, etc.).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a media player, a social networking application, a navigation program, etc.) to retrieve content from other devices over network 106. For example, client device 102 may communicate with any number of content sources 108, 110 (e.g., a first content source through nth content source). Content sources 108, 110 may provide webpage data and/or other content, such as images, video, audio, or an application to client device 102. Computer system 100 may also include a search service 104 configured to perform a web search in response to a search query received from client device 102. For example, search service 104 may return hyperlinks or other resource identifiers for any of content sources 108-110 to client device 102 based on a given search query. For example, search service 104 may provide a hyperlink to content source 108, if content source 108 serves a webpage devoted to golf and client device 102 requests a search for golf-related content.

Network 106 may be any form of computer network that relays information between client device 102, content sources 108, 110, and search service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be of any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other content received from content sources 108, 110, and/or third-party content selected by search service 104.

Content sources 108, 110 may be one or more electronic devices connected to network 106 that provide content to client device 102. For example, content sources 108, 110 may be computer servers (e.g., FTP servers, file sharing servers, web servers, etc.) or a combination of servers (e.g., data centers, cloud computing platforms, etc.). Content may include, but is not limited to, webpages, audio data, video data, and other forms of data files (e.g., spreadsheets, text files, images, etc.). Similar to client device 102, content sources 108, 110 may include processing circuits having processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

Similar to content sources 108, 110, search service 104 may be one or more electronic devices connected to network 106 that provides data to client device 102 for presentation to a user. Search service 104 may include a computer server (e.g., an FTP server, file sharing server, web server, etc.) or a combination of servers (e.g., a data center, a cloud computing platform, etc.). Search service 104 may include a processing circuit including a processor 120 and a memory 122 that stores program instructions executable by processor 120. In cases in which search service 104 represents a combination of servers or other computing devices, processor 120 represents their collective processors and memory 122 represents their collective memories.

Search service 104 is configured to provide a listing of webpages or other online services available from content sources 108, 110 in response to a search query. In some implementations, search service 104 may maintain an index of keywords or topics of the webpages or other services available from content sources 108, 110. For example, search service 104 may use text and/or image recognition on a webpage from content source 108 to identify keywords or a topic of the webpage. In response to receiving a search query from client device 102, search service 104 may match the search query to the index, to determine the best matching webpages or other services from content sources 108, 110. The received search query may be in text form or may be converted into text form by search service 104 (e.g., search service 104 may use voice recognition to convert a spoken search query into text form). Search service 104 may then provide the network addresses of the matching webpages or other services to client device 102 for presentation on display 116 or via another user interface device. For example, the search results may be presented as hyperlinks on a webpage-based search result screen, as links in a stand-alone application, or as audible search results played by a speaker of client device 102. Since the search results were specifically requested by client device 102, they may be considered as being first-party content.

According to various implementations, search service 104 may also be configured to identify one or more search entities related to a search query received from client device 102. In many cases, a search entity corresponds to a named entity in the physical world (e.g., a particular person, place, piece of media content, etc.). In contrast to search results which may differ depending on the exact phrasing of a search query, a search entity may be configured to represent the actual concept underlying a search. For example, the search queries for "Sheriff Bob the Movie" and "Sheriff Bob reviews" may yield different search results from search service 104. In the former case, the search results may include links to webpages that provide facts about the Sheriff Bob movie (e.g., when the movie was released, who stars in the movie, the movie's budget, etc.). In the latter case, the search results may instead include links to webpages that review the Sheriff Bob movie. Underlying both searches, however, is the concept of the Sheriff Bob movie. In some implementations, search service 104 may analyze a given search query to determine the search entity most likely underlying the search. Thus, search service 104 may determine that both searches relate to the search entity for the Sheriff Bob movie.

Search entities may be related to one another. For example, the search entity for the actor, "John Doe," may be related to the search entity for the movie "Sheriff Bob," if John Doe starred in the movie. Relationships between search entities may be any type of relationship between their corresponding physical entities. For example, two locations may be related based on their proximity to one another, a piece of media content (e.g., a song, movie, album, etc.) may be related to an actor or musician that performed in the media content, or two people may be related by blood, marriage, or adoption. In some implementations, two search entities may be related based on how often searches for the two entities originated from the same source. For example, users that are interested in the actor John Doe may also be interested in Kapinski the Singing Koala, even though the two never appeared in the same movies together and are not otherwise related. If a high enough number of users searched for both entities, however, the two may be related based on the users' interests. In further implementations, search entities may be related based on semantics (e.g., search entities that have the same or similar names). For example, the "Leaning Tower of Pisa" search entity corresponding to the landmark in Pisa, Italy may be related to the "Leaning Tower of Shoes" search entity corresponding to a particular shoe store located in Bangor, Me., since a search query of "Leaning Tower" may relate to either of the two entities.

In various implementations, a search entity used by search service 104 may also have one or more online actions associated with it, thereby forming one or more entity-action pairs. Online actions may be any type of actions that can be performed regarding a particular search entity. Exemplary online actions may include, but are not limited to, getting directions to a particular event or location, downloading or streaming a particular piece of media content, making an online purchase, making reservations (e.g., at a restaurant, hotel, airline, etc.), playing a game, making a donation to a particular charity or other organization, signing up for email or text alerts, navigating to a particular website, contacting a particular person or entity, reading reviews about a product or service, comparing prices across retailers, shopping for a product or service, saving an offer for a product or service, purchasing a product or service, getting a quote for a product or service, getting more information from a third-party provider regarding a product or service, joining or enrolling in a program (e.g., joining a streaming service, etc.), making an appointment, setting up a service (e.g., cable television, satellite television, Internet connectivity, etc.), viewing an email, tracking a package, creating an event for a social networking system, or checking in to a business (e.g., an airline, a hotel, etc.). The types of online actions associated with a search entity may also depend on the type of the entity. For example, actions relating to downloading or streaming may only be associated with search entities for media content. In some implementations, search entities and/or their associated actions may be hardcoded or otherwise defined by the operator of search service 104. In further implementations, search entities and/or their associated actions used by search service 104 may be defined via an online project (e.g., an online encyclopedia or other open source project) or may be identified automatically by search service 104. For example, search service 104 may identify new search entities, their relationships, and/or any associated online actions when indexing the webpages or other services provided by content sources 108, 110.

Search service 104 may be configured to allow third-party content providers to provide their content in conjunction with search results to client device 102. For example, a third-party content provider, such as an advertiser, may compensate the operator of search service 104 for the ability to include a paid hyperlink with search results provided to client device 102. In some implementations, search service 104 may conduct a content auction to select which third-party content is provided with the search results. Such an auction may be conducted in real-time (e.g., in response to search service 104 receiving a search query), in near real-time, or at any time, in various implementations. In some cases, a third-party content provider may specify auction parameters that control how and when a bid is placed in a content auction on behalf of the provider. For example, a third-party content provider may specify bidding parameters that control the amount of the provider's bid in a given auction (e.g., a minimum bid, a maximum bid, a target bid, a budget, etc.). In some implementations, a third-party content provider may also specify one or more search terms or phrases to control when an auction bid is placed on the provider's behalf. For example, a third-party advertiser may specify that they wish to place an advertisement link with search results, whenever a client device searches for the phrase "Leaning Tower of Shoes." Such an advertisement may be a hotlinked image, a hyperlink denoted as being a paid advertisement within the search results, or other form of third-party content presented in conjunction with the search results.

Auction parameters may be received by search service 104 in any number of different ways. In some implementations, search service 104 may receive auction parameters from a third-party content provider via a webpage-based input mechanism or via a stand-alone application (e.g., an application specifically configured to provide data to search service 104). In other words, search service 104 may provide a user interface to third-party content providers to specify auction-related data to search service 104. In further implementations, search service 104 may receive auction parameters via a feed from a third-party content provider. A feed may be any form of text-based data that contains auction parameters and may be uploaded to search service 104.

According to some implementations, search service 104 may be configured to associate auction parameters with a particular search entity or entity-action pair. In contrast to auction parameters focused on particular sets of search terms, an entity-action pair may underlie any number of different search queries. In response to receiving a search query from client device 102, search service 104 may identify the most likely search entity underlying the search, any other search entities related to it, and/or any entity-action pairs for the search entity. By tying third-party content to particular entity-action pairs, third-party content providers may compete in content auctions against other providers that offer the same products or services. For example, a third-party content provider may specify auction parameters via search service 104 that their content is related to the entity-action pair of {Sheriff Bob, stream}, e.g., the provider runs a streaming service that has the Sheriff Bob movie available for streaming. If the provider were to use search terms instead, he or she may be competing against other providers that offer different services. For example, the streaming provider may compete against another third-party provider that sells DVD copies of the Sheriff Bob movie when the search term "Sheriff Bob" is received by search service 104. In cases in which the profit margins for the different services or products also differ, this could lead to the higher margin product or service always being selected, since their corresponding providers may be willing to use higher bid amounts. By tying auction parameters to entity-action pairs, however, a streaming provider may compete against other streaming provider, a DVD retailer may compete against other DVD retailers, etc.

After identifying the most relevant search entity to a received query, search service 104 may rank any online actions or other search entities related to the entity. In some implementations, search service 104 may do so based on the terms used in the search query. For example, a search query for "Sheriff Bob streaming" may be more closely related to the entity-action pair of {Sheriff Bob, stream} than an entity-action pair regarding purchasing a DVD copy of the movie. Search service 104 may use such a ranking to determine which, if any, content auctions are to be performed. For example, search service 104 may determine that content auctions are to be conducted for the top five ranked entity-action pairs for a given search query. In some implementations, search service 104 may select multiple third-party content providers for a given entity-action pair. For example, the top two bidders in a content auction for the entity-action pair of {Sheriff Bob, stream} may be allowed by search service 104 to include their content for presentation with search results from the service. In some implementations, search service 104 may conduct a content auction as a second-price auction (e.g., the top bidder actually pays the second highest bidder's amount, the second highest bidder pays the third-highest bidder's amount, etc.). In further implementations, search service 104 may impose a threshold cap on the number of third-party content providers that can win a given content auction. For example, search service 104 may impose a maximum of three advertisements for a given entity-action pair. In yet further implementations, search service 104 may select third-party content based in part on a quality score or other metric for the third-party content's provider. For example, a click through rate (e.g., a measure of how likely a user is to click on the provider's content) may be used in addition to, or in lieu of, the provider's content auction bid to determine whether or not the provider's content will be shown with the search results. In other words, a third-party content provider that has the highest auction bid may nonetheless be passed over for content selection if the provider has a low quality score. Entity-action pairs may also have associated reserve prices set in search service 104 such that one or more bids must be above the reserve price before its associated content will be selected for presentation with the search results.

Search service 104 may vary the visual layout of third-party content in accordance with its ranking of a search entity's relationships. In various implementations, the visual layout of third-party content may be varied such that the content is displayed more prominently (e.g., if the content is closely related to the search query) or less prominently (e.g., if the content is more distally related to the search query). Adjustments to a visual layout to emphasize third-party content may include, but are not limited to, increasing the font of the content, increasing the size of an image, increasing the area in which the content is to appear, adding a graphical effect to the content (e.g., a highlighting, a flashing image, etc.), or positioning the content towards the top of the search result screen. Similarly, adjustments to a visual layout to deemphasize third-party content may include, but are not limited to, decreasing the font or size of the content, removing a graphical effect, or positioning the content further towards the bottom of the search result screen. In some implementations, search service 104 may also include information regarding the exact relationship between third-party content for a lower ranked entity-action pair and the identified search entity for a search query. For example, a search entity for the Sheriff Bob movie may be related to the search entity for the Kapinski the Singing Koala based on a large percentage of users searching for both entities. In such a case, search service 104 may present a third-party advertisement to sell Kapinski the Singing Koala's latest album in response to a search query regarding the Sheriff Bob movie and include information with the search results that indicates how the entity-action pair is related to the primary search entity (e.g., "Users that searched for the Sheriff Bob movie also searched for Kapinski the Singing Koala").

Figure 2:
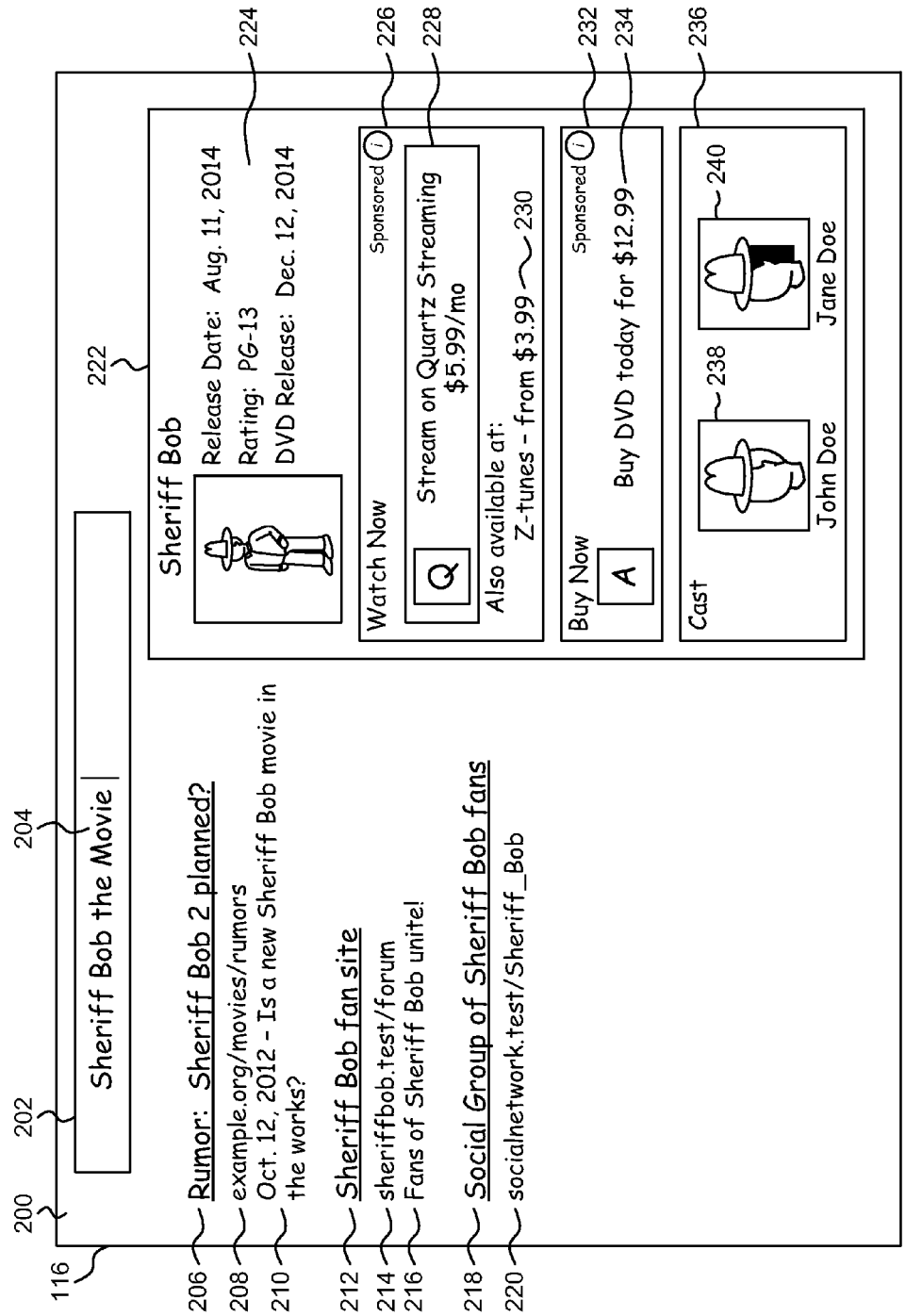
FIG. 2 is an example illustration of an electronic display showing a search entity on a search result screen.

Referring now to FIG. 2, an example illustration is shown of an electronic display showing a search entity on a search result screen, according to exemplary implementations. In the example shown, search result screen 200 may be provided to the electronic display 116 of client device 102 in response to client device 102 sending a search query to search service 104. In some implementations, search result screen 200 may be a webpage provided by search service 104 to client device 102 and presented on electronic display 116 via an executed web browser application. In other implementations, search result screen 200 may be presented on electronic display 116 via a stand-alone application executed by client device 102. A stand-alone application may be specifically configured to send search requests to search service 104 and to receive search results therefrom. Some or all of the content presented on search result screen 200 may be provided by search service 104 to client device 102, in various cases.

Search result screen 200 may include a search query input field 202 configured to receive a search query 204 from a user interface device. In some implementations, search query input field 202 may be presented directly on or with search result screen 200. For example, search results presented on search result screen 200 may be dynamically updated based on the current search query entered via input field 202 (e.g., changing search query 204 to be a different search query may cause different search results to be presented). In other implementations, search query input field 202 may be presented on a different screen than that of search result screen 200. For example, client device 102 may navigate from a search query screen to search result screen 200 in response to a search query being performed.

In the example shown, assume that the text "Sheriff Bob the Movie" has been entered into input field 202 as search query 204 and that a search has been initiated (e.g., in response to the Enter key being pressed on a keypad, in response to a pointing device selecting a search-related button, etc.). In response, search query 204 may be communicated to search service 104 and used by the service to retrieve any number of links to webpages or other online services related to search query 204. Search service 104 then may return the identified links and any corresponding data to client device 102 for presentation on search result screen 200. Search result screen 200 may include any number of hyperlinks for webpages or other online resources that relate to search query 204. For example, the highest ranked search result may correspond to a webpage that publishes rumors regarding a Sheriff Bob sequel, the second highest ranked search result may correspond to a webpage that allows fans of the Sheriff Bob movie to post messages, and the third highest ranked search result may be to a social networking group of Sheriff Bob fans. The search results may have hyperlinks 206, 212, 218, respectively, which are configured to redirect client device 102 to the webpages when clicked. In some cases, the search results may also have indications 208, 214, 220 of the network addresses associated with hyperlinks 206, 212, 218. For example, indication 208 on search result screen 200 may indicate that clicking hyperlink 206 will cause client device 102 to navigate to the webpage located at http://www.example.org/movies/rumors. In some implementations, additional information regarding the search results may also be presented as part of search result screen 200. For example, information 210, 216 may include information regarding when the webpage was last updated, a preview of text or images appearing on the webpage, or other such information.

According to various implementations, search service 104 may also use search query 204 to identify one or more search entities related to search query 204. For example, search service 104 may determine that search query 204 is most closely related to the search entity for the Sheriff Bob movie. In some implementations, search service 104 may provide information regarding the identified search entity to client device 102 for presentation within a knowledge panel 222. For example, search service 104 may provide various facts 224 to client device 102 for presentation within knowledge panel 222. These facts may include general information about the Sheriff Bob search entity, such as when the movie was first released, the movie's rating, when the DVD of the movie was released, or other such information.

In addition to, or in lieu of, presenting facts 224 as part of knowledge panel 222, search service 104 may also select and provide additional content for presentation as part of knowledge panel 222 based on the relationships between the Sheriff Bob search entity, other search entities, and/or any online actions. In some cases, search service 104 may rank the related entities and/or actions based in part on search query 204. For example, search service 104 may determine that search query 204 does not include any search terms directly related to an online action, but that streaming Sheriff Bob and purchasing a DVD of the movie are the top two most popular online actions for the search entity. In such a case, search service 104 may conduct separate content auctions for the identified {Sheriff Bob, stream} and {Sheriff Bob, buy DVD} entity-action pairs. Links to the auction winners' websites or services may then be provided by search service 104 for presentation within knowledge panel 222. As shown, a first panel 226 may be presented as part of knowledge panel 222 based on the results of the auction for the {Sheriff Bob, stream} entity-action pair. Similarly, a second panel 232 may be presented as part of knowledge panel 222 based on the results of the auction for {Sheriff Bob, buy DVD} entity-action pair.

Each of panels 226, 232 may include third-party content from any number of different providers. In some implementations, search service 104 may impose a maximum number of auction winners for each entity-action type. For example, the entity-action pair to stream the Sheriff Bob movie may allow third-party content to be presented by two different providers at once, while the entity-action pair to purchase the Sheriff Bob DVD may allow third-party content from a single provider to be presented at any given time. Each of panels 226, 232 may also include an indication that they contain third-party content. For example, panels 226, 232 may self identify themselves as containing sponsored content, thereby distinguishing their third-party content from the first-party search results on screen 200.

Third party content presented in panels 226, 232 may include hotlinks to their respective provider's websites or services, in some implementations. For example, panel 226 may include third-party content 228 (e.g., a link to one provider's streaming service) and third-party content 230 (e.g., another link to a different provider's streaming service). Similarly, panel 232 may include third-party content 234 (e.g., a link to a provider's retail website that sells the Sheriff Bob DVD). In some implementations, third-party content may also include additional information, such as a cost associated with the online action. Panels 226, 232 may include indicia regarding the name of the third-party content provider, a logo for the third-party content provider, a price associated with the provider's product or service, or other such information. For example, third-party content 228 may include the price to join its corresponding provider's streaming service (e.g., the streaming service costs $5.99 per month). In another example, third-party content 230 may include information regarding the cost to stream only the Sheriff Bob movie from another provider.

Search service 104 may determine that other search entities are related to the Sheriff Bob search entity and should be presented as part of knowledge panel 222. For example, assume that the Sheriff Bob movie stars the actor "John Doe" and the actress "Jane Doe." Each of these performers may have their own corresponding search entity. In such a case, search service 104 may also provide a panel 236 for presentation in knowledge panel 222 that includes search entities 238, 240 (e.g., links to the search entities for John Doe and Jane Doe, respectively). Selecting either of these links using an input device may cause knowledge panel 222 to be updated with the corresponding search entity and/or cause search query 204 to be updated and a new search conducted for the corresponding entity.

In some implementations, search service 104 may determine the visual layout of knowledge panel 222 and its constituent components based on search query 204. Search service 104 may determine how closely related an entity-action pair or other search entity is to search query 204, so that they can be ranked. For example, search service 104 may determine that search query 204 is broadly related to the search entity for the Sheriff Bob movie. Search service 104 may also determine how related any other entity-action pairs are to the search and/or any other search entities that may be related to the entity for the Sheriff Bob movie. Search service 104 may also determine the strength of these relationships based on how closely the search query matches the entities and entity-action pairs, on how often users click on the related entities and entity-action pairs when presented, or both. Using the strength of these relationships, search service 104 may select which search entity is to appear in knowledge panel 222, which entity-action pairs are to appear in knowledge panel 222 (e.g., which types of third-party content are to be presented), and/or which secondary search entities are to appear in knowledge panel 222 (e.g., search entities 238, 240 may be presented based on their relationship to the Sheriff Bob search entity). In some implementations, search service 104 may simply select the highest ranked entity-action pairs or search entities for presentation in knowledge panel 222. In other implementations, search service 104 may also determine which content is to appear in knowledge panel 222 based on the results of a content auction. For example, an entity-action pair may receive a lower ranking if its winning bids are lower than for other entity-action pairs or may receive a higher ranking if its winning bids are higher than for other entity-action pairs. In some cases, an entity-action pair may lose its ranking if its content auction bids are below a reserve auction price used by search service 104.

Search service 104 may vary the visual layout of knowledge panel 222 to emphasize higher ranked content and deemphasize lower ranked content. In various implementations, search service 104 may emphasize a secondary search entity or third-party content associated with a highly ranked entity-action pair by positioning the content towards the top of knowledge panel 222 (e.g., towards the top of search result screen 200), using a larger font than other content in knowledge panel 222, including an icon or graphic with the content, adding a highlighting to the content, or using any other visual means to draw a user's attention towards the third-party content. In further implementations, search service 104 may deemphasize a secondary search entity or third-party content associated with a lower ranked entity-action pair by positioning the content towards the bottom of knowledge panel 222 (e.g., further towards the bottom of search result screen 200), using a smaller font than other content in knowledge panel 222, removing an icon or graphic from the content, or using any other visual means to deemphasize the content on search result screen 200.

Figure 3:
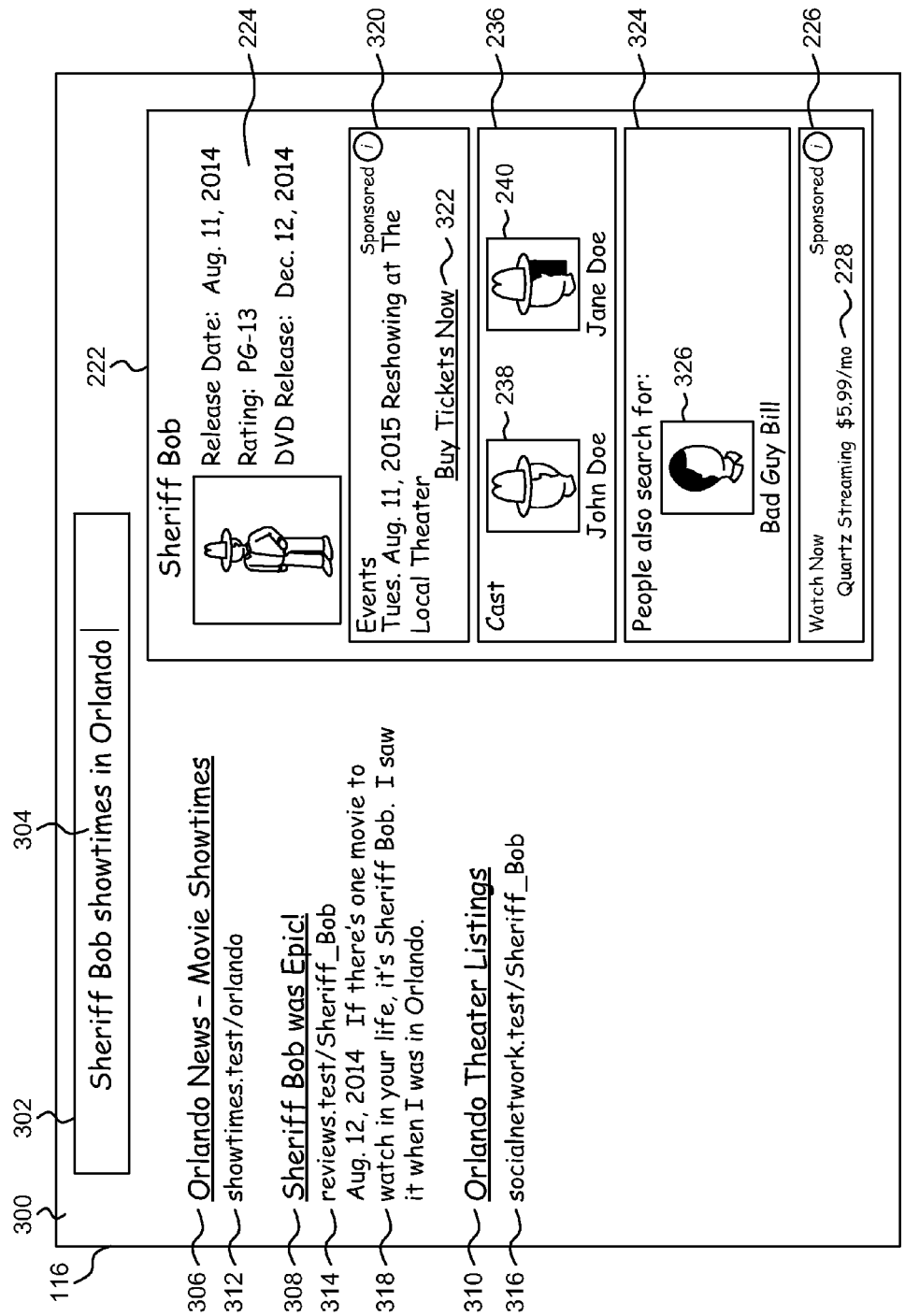
FIG. 3 is another example illustration of a search entity being displayed on a search result screen by an electronic display.

Referring now to FIG. 3, another example illustration of a search entity being displayed on a search result screen is shown, according to various implementations. Similar to the example of FIG. 2, client device 102 may send a search query to search service 104 and receive search results for presentation on search result screen 300 by electronic display 116. Search result screen 300 may be a webpage provided by search service 104 to client device 102 and presented on electronic display 116 via an executed web browser application or may be part of a stand-alone application executed by client device 102 and specifically configured to use search service 104.

Search result screen 300 may be configured to perform the same or similar function as that of search result screen 200 shown in FIG. 2. As shown, search result screen 300 may include a search query input field 302 configured to receive a search query from a user interface device of client device 102. Client device 102 may communicate a search query entered into field 302 to search service 104, in response to receiving a command from a user interface device to perform a search. For example, client device 102 may communicate the entered search query 304 (e.g., "Sheriff Bob showtimes in Orlando") to search service 104. In response, search service 104 may use search query 304 to identify webpages or other online resources that match the query (e.g., by searching an index of webpages or other resources for keywords or other search terms of the query). Search service 104 may then provide the matching search results to client device 102 for presentation on search result screen 300.

As shown, search result screen 300 includes first-party search results 306-310, which are selected by search service 104 based on search query 304. Search results 306-310 may be presented on search result screen 300 as hotlinks (e.g., links configured to redirect client device 102 to the corresponding webpages when selected). Search result screen 300 may also include indications 312-316 for search results 306-310, respectively, that convey the underlying network locations of the search results (e.g., where client device 102 will be redirected if one of the hyperlinks is selected). Search result screen 300 may also include additional information regarding the search results, such as when the corresponding webpages were last updated, a preview of the webpages, etc. For example, search result 308 may include additional information 318, which lists the date the webpage was last modified and a preview of the webpage.

Since search query 304 differs from that of search query 204, search results 306-310 may also differ from search results 206, 212, 218. For example, both search query 204 and search query 304 may both relate to the topic of "Sheriff Bob." However, search query 204 may be more related to the general topic of the movie, while search query 304 includes the more specific search terms "showtimes in Orlando." In some implementations, search service 104 may match the search terms "Sheriff Bob," "showtimes," and "Orlando" to an index of keywords and phrases that appear on various webpages. Based on the frequency of the terms on the webpages or other factors, search service 104 may select search results 306-310 based on their webpages referring to both Sheriff Bob and Orlando. If the webpages in search results 208, 212, and 218 do not contain the search term "Orlando," for example, the search results appearing on search result screens 200 and 300 may differ.

Although the search results on screen 300 may differ from those of screen 200, search service 104 may determine that both search queries 204, 304 are still related to the same search entity for the Sheriff Bob movie. As a result, search result screen 300 may include the knowledge panel 222 for the Sheriff Bob search entity, similar to search result screen

200. Knowledge panel 222 may include the same or similar facts 224 regarding the movie shown on search result screen 200, such as when it was released in theaters and on DVD, the rating of the movie, etc.

Search service 104 may identify and rank entity-action pairs or other search entities based on their relationships to search query 304 and/or to the search entity for the "Sheriff Bob" movie. For example, the phrase "showtimes in Orlando" may be a strong indicator that the intent behind search query 304 is to purchase movie tickets to Sheriff Bob in Orlando. Thus, search service 104 may determine that the highest ranked entity-action pair for search query 304 is the entity-action pair {Sheriff Bob, purchase tickets}. In response, search service 104 may conduct a content auction among third-party content providers that sell movie tickets in the Orlando area. Based on the results of the auction, content from one or more providers may be selected for presentation in panel 320. For example, third-party content 322 (e.g., a link to the website of "The Local Theatre," a movie theater in the Orlando area) may be presented in panel 320.

Search entities related to the "Sheriff Bob" search entity may also be provided for presentation in knowledge panel 222 based on their relationships to search query 304 and/or the "Sheriff Bob" search entity. For example, search entities 238, 240 for John Doe and Jane Doe, respectively, may be highly ranked, due to their corresponding actors appearing in the Sheriff Bob movie. In another example, search entities 238, 240 may be highly ranked based on how often searches were performed for both the actors and the movie itself. Based on this ranking, search entities 238, 240 may be provided by search service 104 for presentation in panel 236 of knowledge panel 222. A search entity 326 for the movie "Bad Guy Bill" may also be identified and ranked by search service 104. Based on its ranking, search service 104 may provide search entity 326 for presentation in panel 324 of knowledge panel 222. For example, assume that "Bad Guy Bill" is another movie playing at the same time as "Sheriff Bob" and that a certain number of search queries for both movies were performed by users. In some implementations, panel 324 may include an indication of the relationship between the search entities for "Sheriff Bob" and "Bad Guy Bill" (e.g., that some users searched for both movies).

The {Sheriff Bob, streaming} entity-action pair may also be identified by search service 104 based on its relationship to search query 304 and ranked relative to the other search entities (e.g., search entities 238, 240, and 326) and/or other entity-action pairs (e.g., the pair {Sheriff Bob, purchase tickets}). In some cases, a user that searches for movie tickets for a particular movie may also be interested in streaming the same movie, if it is available. Thus, the {Sheriff Bob, purchase tickets} entity-action pair may receive a high enough ranking to have corresponding third-party content included on search result screen 300. Search service 104 may conduct a content auction among third-party content providers that provide streaming services that differs from that of the content auction among movie ticket sellers. Based in part on the results of the auction, quality scores associated with the providers, or other factors, search service 104 may determine that third-party content 228 (e.g., a link to the "Quartz Streaming Service") is to be presented in panel 226.

In various implementations, search service 104 may determine the visual layout of knowledge panel 222 and any third-party content that appears in it based on the ranking of entity-action pairs and/or related search entities. For example, search service 104 may determine that the {Sheriff Bob, purchase tickets} entity-action pair is the highest ranked pair. In such a case, the corresponding third-party content 322 appearing in panel 320 may receive a larger font than other content in knowledge panel 222, may be placed further towards the top of search result screen 300 than the other content, may receive a highlighting or other visual effect to draw a user's attention towards panel 320, or the like. In contrast to third-party content 322, the third-party content 228 in panel 226 associated with the streaming action may be visually deemphasized when compared to third-party content 322. As shown, for example, panel 226 may be presented towards the bottom of search result screen 300 or in a smaller font than other content in knowledge panel 222. In some implementations, the number of third-party content providers that are able to provide content in panel 226 may also be based on the ranking of its corresponding entity-action pair. For example, panel 228 may be limited to displaying third-party content from only one streaming service on search result screen 300, since the {Sheriff Bob, stream} entity-action pair has a relatively low rank based on search query 304 (e.g., the searcher is likely interested in purchasing movie tickets but may or may not be interested in streaming the movie, instead).

By associating third-party content with an entity-action pair instead of specific search terms and phrases, a provider's content may be presented with search results for any number of different search queries. For example, third-party content 228 may appear on both search result screens 200 and 300, despite search queries 204 and 304 having different search terms. In addition, the visual layout for the content may be varied by search service 104 in any number of different ways based on the relationships between the search query, the primary search entity, the entity-action pair associated with the third-party content, and/or any secondary search entities selected for presentation on a search result screen. For example, third-party content 228 may appear at any location in knowledge panel 222 and using any number of different font sizes or other graphical effects that visually emphasize or deemphasize third-party content 228 in relation to other content appearing in knowledge panel 222. Thus, an association between a particular piece of third-party content and an entity-action pair may result in the content being presented in any number of different ways.

Figure 4:
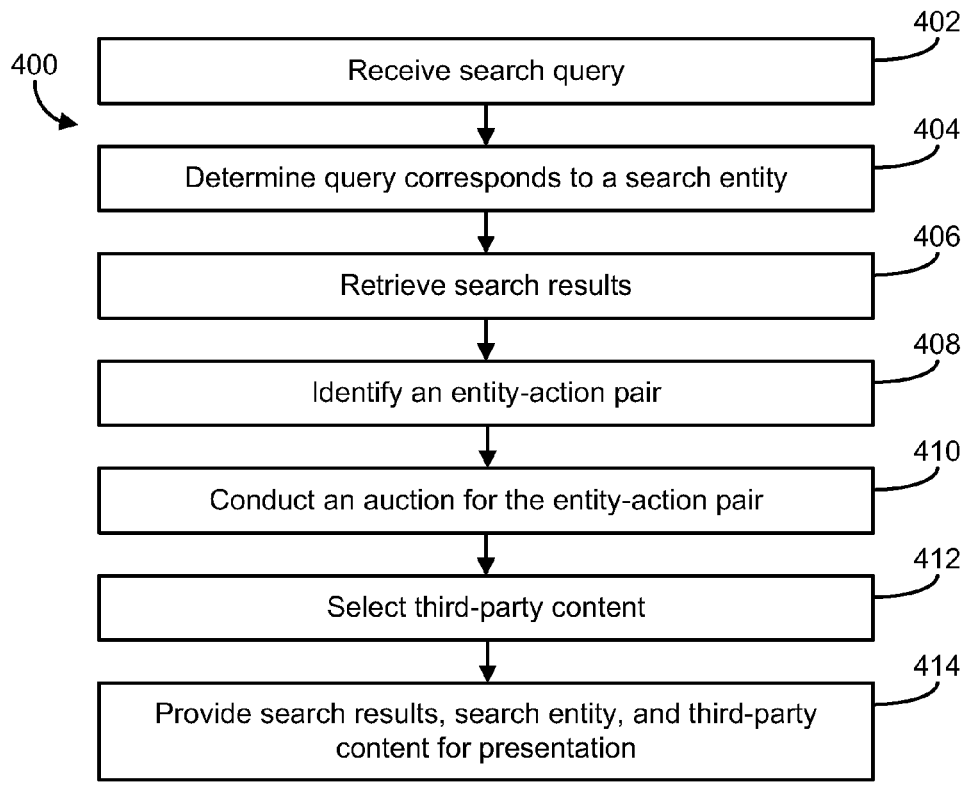
FIG. 4 is a flow diagram of a process for providing third-party content on a search result screen based on an entity-action pair.

Referring now to FIG. 4, a flow diagram of a process 400 is shown for providing third-party content on a search result screen based on an entity-action pair, according to various exemplary implementations. In general, process 400 allows search results to include third-party content that has been selected for presentation based on an entity-action pair. In various implementations, the third-party content may not be associated with a particular set of search keywords or phrases, but instead be associated with an entity-action pair. Process 400 may be implemented by a search service, such as search service 104 in FIG. 1. Process 400 may also be implemented by another device or set of devices working in conjunction with a search service to select third-party content for presentation with search results.

Process 400 may include receiving a search query (block 402). In some implementations, a search query may include one or more text-based search terms. For example, a search query for "Sheriff Bob showtimes in Orlando" may be received. In other implementations, a search query may include audio data, such as a spoken search query detected by a microphone. For example, a user may utter the words "Sheriff Bob showtimes in Orlando." In such cases, voice recognition may be used on the received audio data to convert the search query into a text-based format. The received search query may also be converted or translated into standardized terms for further processing. For example, a search query may be translated into a particular language or its constituent terms normalized to facilitate matching the search query to search results and/or search entities. Terms in the search query may also be matched to terms in a stored dictionary and replaced with the closest matches, to correct typographical errors in the search query.

Process 400 may include determining that the received search query corresponds to a search entity (block 404). In general, a search entity corresponds to a particular person, place, thing, or concept. A search entity may, for example, correspond to a named entity in the physical world, such as a person, piece of media content, business, location, or the like. In some cases, a search entity may correspond to a proper noun. Terms appearing in the search query and/or terms derived therefrom (e.g., spelling corrections, normalized words, translated words, etc.) may be matched to an index of search entity names, in various implementations. One or more additional terms in the search query may also be used to select between different search entities. For example, a search query of "The Leaning Tower" may match the search entity for the "Leaning Tower of Pisa." However, a search query of "Leaning Tower Bangor" may instead match the search entity for the "Leaning Tower of Shoes" located in Bangor, Me.

Process 400 may include retrieving search results based on the search query (block 406). In general, search results refer to the network addresses of webpages or other online resources that correspond to the search query. In some implementations, one or more words in the search query, or words related to those of the search query (e.g., translated query terms, spelling corrections, etc.), may be matched to an index of webpages or other online resources. Such an index may, for example, include data regarding how frequently terms are used on the webpages or other resources. Using the term frequencies or other data (e.g., the location of the client device, etc.), the webpages or other online resources may be ranked and included in a list of search results. For example, a search query of "Sheriff Bob the movie" may result in a list of network addresses to webpages devoted to the topic of Sheriff Bob (e.g., review websites, websites that include movie trivia or facts, etc.).

Process 400 may include identifying an entity-action pair related to the search query (block 408). According to various implementations, the relationship between the search query and one or more entity-action pairs may be identified and analyzed. For example, a search query for "Sheriff Bob showtimes in Orlando" may be strongly related to the entity-action pair of {Sheriff Bob, purchase tickets}. The relationship between the search query and an entity-action pair may be direct or indirect, in various implementations. In the direct case, the entity-action pair is associated with the search entity identified in block 404 (e.g., the primary search entity that corresponds to the search query). For example, a search for the movie "Sheriff Bob" may result in the Sheriff Bob search entity being identified and the {Sheriff Bob, stream} entity-action pair being identified. In the indirect case, the identified entity-action pair is associated with another search entity related to the search entity of block 404 (e.g., a secondary search entity is related to the primary search entity). For example, a search for the singer "Jane Doe" may result in the Jane Doe search entity being identified in block 404. In addition, other search entities related to the Jane Doe search entity may also be identified (e.g., as secondary search entities). For example, assume that Jane Doe sings the song "I Love You," which itself has a corresponding search entity. In such a case, the entity-action pair {I Love You, download} may be identified as being related to the search query.

Process 400 may include conducting a content auction for the identified entity-action pair (block 410). In various implementations, an auction may be conducted among third-party content providers that have associated their respective content with the entity-action pair. For example, third-party content providers may specify auction parameters that include one or more bidding parameters with the entity-action pair. For example, third-party content providers that operate online streaming services may specify bidding amounts to be used in the content auction for the {Sheriff Bob, stream} entity-action pair. If the {Sheriff Bob, stream} entity-action pair is identified as being related to a received search query, a content auction may be conducted using the bidding parameters of the third-party content providers. For example, bidding amounts from different third-party content providers may be compared to select any number of auction winners. In some implementations, the auction may be conducted as a second-price auction in which an auction winner pays the bid amount submitted by the next highest bidder.

In alternate implementations, other payment mechanisms may be employed instead of a content auction. In some implementations, an entity-action pair may be associated with one or more fixed rate schedules. For example, a third-party content provider that agrees to pay a certain rate may have his or her content selected based on the entity-action pair. In some cases, rate schedules may differ based on the time of day, day of the week, day of the year, etc. A rate schedule may also have differing rates depending on whether the third-party content is to be emphasized in relation to other third-party content for the entity-action pair. In further implementations, a rate may be negotiated between a third-party content provider and an operator of a search service beforehand.

Process 400 may include selecting third-party content (block 412). In some implementations, the third-party content may be selected based in part on the results of the content auction conducted in block 410. Third-party content from any number of auction winners may be selected. For example, third-party content from the top three auction participants that operate online streaming services may be selected for presentation based on the entity-action pair {Sheriff Bob, stream}. The number of third-party content providers from whom content is selected for presentation at a client device may be based on the results of the content auction, the ranking of the entity-action pair (e.g., how related the entity-action pair is to the search query), or other factors. In further implementations, the third-party content may be selected based in part on a quality score. A quality score may, for example, be a measure of the likelihood of a user performing a specific action when presented with the third-party content (e.g., clicking on the third-party content, making a purchase from a third-party content provider, etc.). In some cases, a quality score for a third-party content provider may offset a bid from the provider in a content auction. In other words, content from a third-party provider that has a high auction bid, but a low quality score, may not be selected for presentation at the client device.

Process 400 may include providing the search results, the identified search entity, and the third-party content for presentation on a search result screen (block 414). Once third-party content has been selected for an entity-action pair related to the received search query, the third-party content may be provided for presentation with the resulting search entity and search results. For example, a link to a third-party streaming service may be provided in conjunction with the search entity and the search results. In some implementations, separate third-party content may be selected for presentation as a third-party search result (e.g., as a paid search result), in addition to the third-party content selected based on an entity-action pair. For example, the search result screen may include a sponsored hyperlink to a third-party provider's website with other hyperlink search results and a third-party button with a search entity that allows a user to download a particular song.

Figure 5:
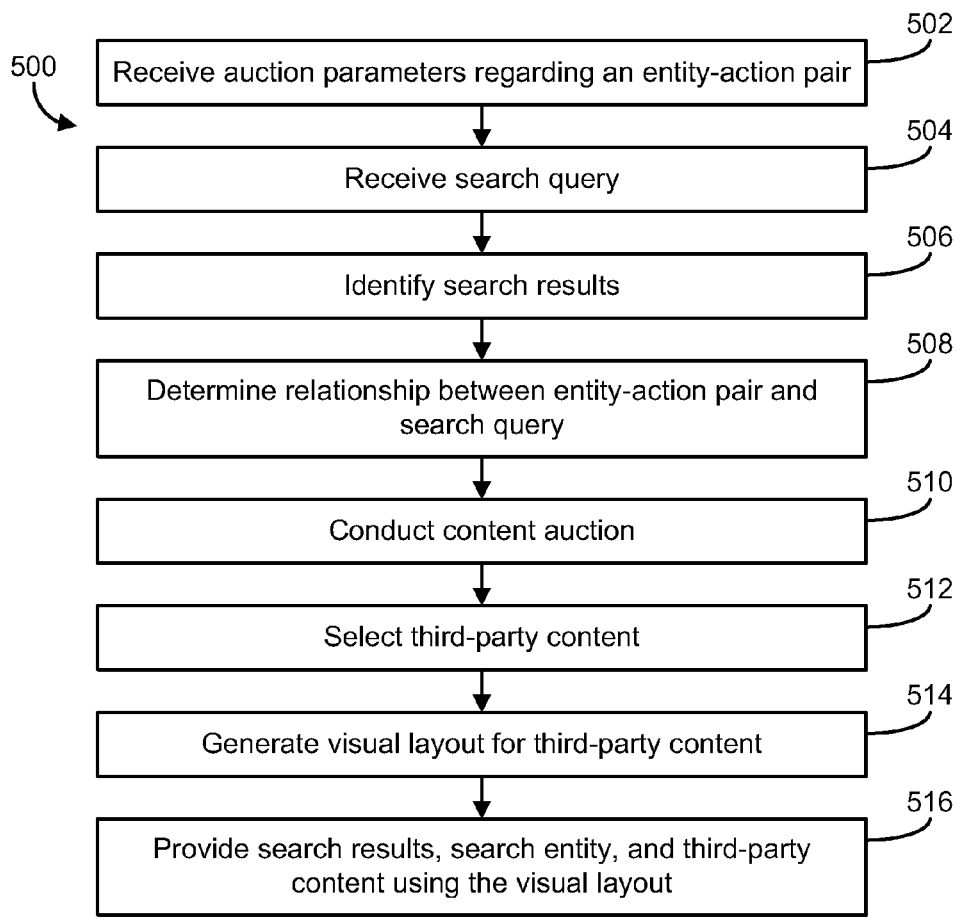
FIG. 5 is a flow diagram of a process for generating a visual layout for third-party content selected based on an entity-action pair.

Referring now to FIG. 5, a flow diagram is shown of a process 500 for generating a visual layout for third-party content selected based on an entity-action pair, according to various exemplary implementations. In general, process 500 allows for the visual layout of third-party content to be varied, depending on the relationship between the entity-action pair and the search query. If auction parameters, such as a bid amount, are tied to the entity-action pair, this means that the third-party content may be presented with search results for any number of different search queries. In various implementations, process 500 may be implemented with process 400 or may be implemented alone. Similar to process 400, process 500 may be implemented by a search service, such as search service 104 in FIG. 1. Process 500 may also be implemented by another device or set of devices working in conjunction with a search service to select third-party content for presentation with search results.

Process 500 may include receiving auction parameters regarding an entity-action pair (block 502). In general, auction parameters control how and when a bid is placed in a content auction on behalf of the provider. The auction parameters may include one or more bidding parameters that control the amount of the provider's bid in a content auction. For example, a third-party content provider may specify a minimum bid, a maximum bid, a target bid, or a budget that may control the amount that the provider bids in a given auction. According to various implementations, one or more bidding parameters may also be associated with an entity-action pair. Such a pair may correspond to a search entity (e.g., a named entity in the physical world) and an online action that can be performed regarding the search entity. For example, a third-party content provider may specify a search entity for a particular movie and an online action of "streaming." Thus, whenever the entity-action pair is determined to be relevant to a search query, the third-party content provider may compete in a content auction to include the provider's content with the search results for the search query. According to various implementations, the auction parameters may be received via a feed. A feed may be any form of text-based data that contains auction parameters (e.g., an uploaded text file, an uploaded spreadsheet, an XML file, etc.). In some implementations, a hybrid approach may be taken in which certain auction parameters are received via a user interface and other auction parameters are received via a feed. For example, the display name of the third-party content provider, the domain of the provider's content, one or more images to be displayed with the third-party content, bidding information, or other such data may be received outside of a feed.

In one example, feeds for different entity-action pairs may include common parameters that are used across the different entity-action pairs. Such common parameters may be formatted as follows:

TABLE 1

| Parameter Name | Required? | Repeated? | Description |
| --- | --- | --- | --- |
| Feed_item_ID | yes | no | An item ID that is unique across all feeds of a third-party content provider |
| type | yes | no | Feed item type (e.g., movie, album, song, book, etc.) |
| action | yes | no | Action name (e.g., subscribe to a service, make a purchase, etc.) |
| Landing_page | yes | no | The URL of the webpage where the action can be performed. |
| price | yes | no | The price to be paid by a user to perform the online action. |
| Subscription_period | yes, if the action is a service subscription | no | Indicates the subscription period (e.g., daily, weekly, monthly, yearly, etc.) |
| Expiration_date | no | no | Indicates the final date the parameters will be used to provide third-party content |

Additional auction parameters may vary, depending on the type of search entity or online action. For example, auction parameters for different media types (e.g., movies, songs, etc.) may differ.

One example of a feed format for a movie-related search entity is shown below:

TABLE 2

| Parameter Name | Required? | Repeated? | Description |
| --- | --- | --- | --- |
| Feed_item_name | yes | no | |
| type | yes | no | Allowed value: movie |
| Movie_title | yes | no | Full title of the movie (e.g., the name of the search entity) |
| Release_year | yes, if no ID is given | no | Year of release. |
| MID1 | no | no | Movie Identifier (e.g., a unique identifier for a movie used by one provider) |
| MID2 | no | no | Movie Identifier (e.g., a unique identifier for a movie used by a second provider) |
| ... | | | |
| MIDN | no | no | Movie Identifier used by an nth provider. |
| action | yes | no | Allowed action for the movie (e.g., stream, subscribe to a streaming service, purchase, etc.) |
| Landing_page | yes | no | |
| price | yes | no | |
| Subscription_period | no | no | |

As shown in Table 2, the italicized parameters represent parameters that are common to feeds for other types of search entities. Using this format, an exemplary feed for movie-related search entities is as follows:

TABLE 3

| Feed_item_ID | type | Movie_title | Release_year | MID | action | Landing_page | price |
|---|---|---|---|---|---|---|---|
| Item_0 | movie | Sheriff Bob | 2014 | A4 | Buy | http://a.test/242 | 4.99 USD |
| Item_1 | movie | Bad Guy Bill | 2014 | D3 | Subscribe | http://a.test/211 | 1.99 USD |

The exemplary feed shown in Table 3 may, for example, be saved as tab-separated text and uploaded to a search service or may be encoded as XML and provided to the search service. Bidding parameters, such as a bid amount, may be associated with the feed in a user interface of the search service, to allow the parameters in the feed to be used in content auctions.

In another example, a feed format for a music feed may use the same common feed parameters as those in Table 1, as well as parameters regarding the title of the album, the song title, the name of the artist, or any unique identifier for the song. In a further example, a feed format for an e-book may include the common parameters of Table 1, as well as parameters regarding the title of the book, the author of the book, an ISBN or other unique identifier for the book, or the publication year of the book. Any number of different sets of auction parameters may be included in a feed, depending on the type of search entity and online action to be associated with the third-party content from the provider.

Process 500 may include receiving a search query (block 504). Similar to block 402 of process 400, the search query may be in a text-based format or converted into a text-based format from an audio format. The received search query may contain one or more keywords. In some implementations, words in the received search query may be translated or transliterated into another language. In further implementations, words in the received search query may be replaced with other words, such as suggested search terms or spelling-corrected terms.

Process 500 includes identifying search results based on the search query (block 506). Also similar to block 406, search results may be identified and retrieved based on the search query. For example, the terms or phrases in the search query may be matched to an index of network identifiers for webpages or other online resources that use the terms or phrases. In various implementations, the network identifiers may be ranked based on the frequency at which the terms appear on the webpages, the amount of traffic to the webpages, or other factors. For example, the top webpages matching a search query may correspond to those webpages that are the most popular or most relevant to the search query.

Process 500 may include determining a relationship between an entity-action pair and the search query (block 508). In various implementations, a primary search entity may be identified based on the search query. For example, the words or phrases of the search query may be matched to a primary search entity, such as the name of a particular movie included in the search query. In some implementations, the entity-action pair may correspond to the primary search entity. For example, an entity-action pair regarding streaming a particular movie may be related to the search entity for that movie. In further implementations, one or more secondary search entities may also be identified as being related to the primary search entity and the search query. For example, the primary search entity may be a particular movie and a secondary search entity may be a particular actor that appears in the movie. In such cases, the entity-action pair may alternatively correspond to a secondary search entity. For example, the entity-action pair may correspond to streaming a song by an actor that appears in a particular movie. The relationship between the entity-action pair may be based on how the entity-action pair relates to any identified search entities and/or whether the search query contains words or phrases directly related to the entity-action pair. For example, the search query for "Sheriff Bob streaming" may be strongly related to both the Sheriff Bob search entity and to the {Sheriff Bob, stream} entity-action pair, since the search query includes keywords related to both. In another example, the search query for "Sheriff Bob" may still be related to the {Sheriff Bob, stream} entity-action pair, but less so than for the "Sheriff Bob streaming" search query. In further implementations, the relationship between a search query and an entity-action pair may be based in part on the frequency at which users performed the corresponding online action after using the search query to perform a search.

Process 500 may include conducting a content auction (block 510). In various implementations, the auction parameters may control when and how a third-party content provider participates in a given content auction. For example, a third-party content provider that specifies the identified entity-action pair and a bid amount may submit the bid in the content auction. In some implementations, the content auction may be a second-price auction in which a winner of the auction pays the next highest bid amount from another third-party content provider. In further implementations, a quality score for a third-party content provider or the specific content from that provider, may also be used to control whether the provider participates in the auction and/or the results of the auction. For example, a third-party content provider that has a low quality score may not have his or her content selected for presentation with search results, despite having a high bid amount.

Process 500 may include selecting third-party content (block 512). In some implementations, third-party content may be selected based on the results of the content auction of block 510 and/or the providers' corresponding quality scores. Any number of auction winners may be selected to have their third-party content included on a search result screen. In various implementations, the number of auction winners may be based on the specific entity-action pair, the type of online action, and/or the strength of the relationship between the entity-action pair and the search query. For example, a streaming action may be limited to two auction winners, at most. In another example, a streaming action may have three auction winners if the entity-action pair is strongly related to the search query, two auction winners if the entity-action pair is moderately related to the search query, and only one auction winner if the entity-action pair is weakly related to the search query. In further implementations, the number of content auction winners for a particular entity-action pair may also vary depending on the type of relationship between the entity-action pair and the search query. For example, three auction winners may be selected if the entity of the entity-action pair is the primary search entity (e.g., the search entity most closely related to the search query) and two auction winners may be selected if the entity is a secondary search entity (e.g., the search entity is related to the primary search entity).

Process 500 may include generating a visual layout for the third-party content (block 514). According to various implementations, how and where the third-party content is presented on the search result screen may vary depending on the relationship between the underlying entity-action pair and/or whether the third-party content provider was the overall winner of the content auction. In some implementations, third-party content for an entity-action pair that is highly related to the search query may be visually emphasized. For example, the corresponding third-party content may be presented towards the top of the search result screen (e.g., near the top of a knowledge panel), in a larger font than other content related to a search entity, using a highlighting or other graphical effect to draw a user's attention to the third-party content, including an image (e.g., the logo of the third-party content provider), or using any other such visual technique. In further implementations, third-party content for an entity-action pair that is not as strongly related to the search query may be deemphasized. For example, the third-party content may be presented in a smaller font than other content, may lack an icon or other image, may not be highlighted, may be positioned further towards the bottom of the search result screen, or using any other technique that deemphasizes the third-party content when compared to other content appearing on the search result screen.

Process 500 may include providing the search results, the search entity, and the third-party content for presentation on a search result screen that uses the visual layout (block 516). In some implementations, the search result screen may be a webpage that displays the search results, the primary search entity, and the third-party content. In other implementations, the search result screen may be part of a stand-alone application that is specifically configured to use the search service. The third-party content associated with an entity-action pair may be included on the search result screen as part of a knowledge panel, in some cases. In other cases, the third-party content may be presented in its own area on the search result screen. In some implementations, the search result screen may also include third-party content associated with a specific set of search terms of phrases. For example, some third-party content providers may specify a specific search query as part of their auction parameters, while other third-party content providers specify a specific entity-action pair as part of their auction parameters. When an entity-action pair is used, the provider's content may be included on the search result screen for any number of different search queries, allowing the provider to present their content across a wide range of searches and using any number of different visual layouts.

In some implementations, a third-party content provider may also specify one or more search terms or phrases to control when an auction bid is placed on the provider's behalf. For example, a third-party advertiser may specify that they wish to place an advertisement link with search results, whenever a client device searches for the phrase "Leaning Tower of Shoes." Such an advertisement may be a hotlinked image, a hyperlink denoted as being a paid advertisement within the search results, or other form of third-party content presented in conjunction with the search results.

Figure 6:
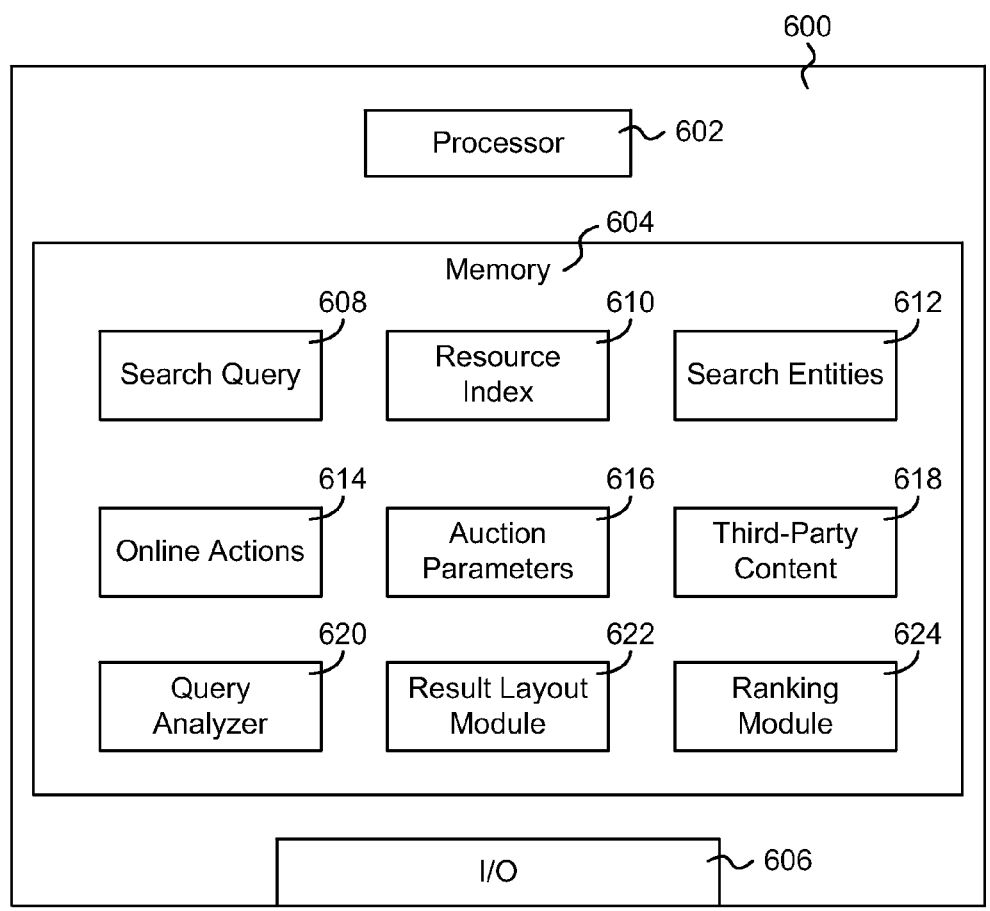
FIG. 6 is a schematic block diagram of a processing circuit configured to select third-party content.

Referring now to FIG. 6, a detailed block diagram of processing circuit 600 is shown, according to various implementations. Processing circuit 600 may be a component of a search service (e.g., search service 104 in FIG. 1 or another server) or another electronic device that facilitates searching for content available via a network. Processing circuit 600 includes processor 602 and memory 604. Processor 602 may be or include one or more microprocessors, an application specific integrated circuit (ASIC), a circuit containing one or more processing components, a group of distributed processing components, circuitry for supporting a microprocessor, or other hardware configured for processing data. Processor 602 is also configured to execute computer code stored in memory 604 to complete and facilitate the activities described herein. Memory 604 can be any volatile or non-volatile computer-readable medium capable of storing data or computer code relating to the activities described herein. For example, memory 604 is shown to include a query analyzer 620, a result layout module 622, and a ranking module 624, which may be implemented using computer code (e.g., executable code, object code, source code, script code, machine code, etc.) configured for execution by processor 602. When executed by processor 602, processing circuit 600 is configured to complete the activities described herein. In implementations in which processing circuit 600 represents a collection of computing devices working together (e.g., servers in a data center, computers on a network, etc.), processor 602 represents the collective processors of these devices and memory 604 represents the collective memories of these devices.

Processing circuit 600 also includes hardware circuitry for supporting the execution of the computer code query analyzer 620, result layout module 622, and ranking module 624. For example, processing circuit 600 includes one or more hardware interfaces 606 configured to receive and/or communicate data between processing circuit 600 and other computing devices. For example, interface 606 may receive a search query 608 from a client device via a network and provide search results to the client device based on search query 608.

Search query 608 in memory 604 may be any text-based string of characters. For example, search query 608 may include the phrase "Sheriff Bob the movie." In some implementations, audio data may be received by processing circuit 600 and converted into search query 608 using voice recognition. For example, a user of a client device may initiate a search by speaking the phrase "Sheriff Bob the movie." Processing circuit 600 may receive the resulting audio data and convert the audio data into search query 608. In some implementations, processing circuit 600 may normalize search query 608, translate search query 608 into another language, or correct typographical errors in search query 608 (e.g., by determining the closest matching search term in a dictionary file).

Memory 604 may include a resource index 610 which indexes network addresses of webpages or other online resources. Resource index 610 may be generated, for example, using a crawling algorithm that traverses links between webpages. In some implementations, resource index 610 includes keywords or topics associated with the network address. For example, the network address for a webpage that reviews golf clubs may be associated with the keywords "golf club reviews." Resource index 610 may also include measures of the frequency of keyword or topics appearing on the webpages. For example, a webpage that mentions "golf clubs" in passing may have a lower term frequency in resource index 610 than a webpage that mentions "golf clubs" fifty times.

Memory 604 may include one or more search entities 612. Search entities 612 may correspond to named entities in the physical world, such as places, people, and things. In general, search entities 612 may correspond to any proper noun. Search entities 612 may be separate and distinct from resource index 610, in some implementations. In other words, a search entity may exist in search entities 612, regardless of how many webpages refer to the entity. Search entities 612 may also include various facts about the search entity that are separate from any indexed webpages or online resources. For example, search entities 612 may include the "Sheriff Bob" search entity, as well as information regarding when the movie was first released. According to various implementations, search entities 612 may be automatically generated by processing circuit 600 (e.g., based on received search queries), may be hardcoded in memory 604, or may be sourced from an online resource, such as an open source or crowd sourced project.

Memory 604 may include one or more online actions 614, which may be associated with search entities 612. Depending on the type of search entity in search entities 612, it may have one or more corresponding online actions 614. For example, a search entity in search entities 612 for a movie may have the corresponding online actions "stream" and "purchase" in online actions 614. In another example, a search entity in search entities 612 for a particular restaurant may have a corresponding online action of "make reservations" in online actions 614. Thus, search entities 612 and online actions 614 may form any number of different entity-action pairs. Similar to search entities 612, online actions 614 may be automatically generated by processing circuit 600 (e.g., by detecting which online actions are performed by users regarding a particular search entity), may be hardcoded in memory 604, or may be sourced from an online resource.

Memory 604 may include auction parameters 616 from any number of third-party content providers. Auction parameters 616 may generally include any parameters that control when and how a third-party content provider participates in a content auction to provide their content with search results. In some implementations, auction parameters 616 may specify one of search entities 612 and an associated online action in online actions 614. For example, a third-party content provider that provides streaming services may specify the entity-action pair {Sheriff Bob, stream}. Auction parameters 616 may be received via interface 606 from a user interface and/or a text-based feed. For example, a third-party content provider that operates a streaming service may specify certain parameters, such as bidding parameters, via a user interface. The provider may also specify entity-action pairs via an uploaded feed (e.g., a list of movies available for streaming, etc.).

In some implementations, memory 604 includes third-party content 618 associated with auction parameters 616. Third-party content 618 may include any third-party data that may be presented in conjunction with search results. For example, third-party content 618 may include pricing information, landing page information (e.g., a network address of the third-party content provider), an icon for the third-party content provider, or other such data that may be selected for presentation with search results.

Query analyzer 620 in memory 604 is configured to identify search results from resource index 610 that correspond to search query 608. In some implementations, query analyzer 620 may match keywords in search query 608 to keywords in resource index 610 to identify the network locations of webpages or other resources that correspond to search query 608. In various implementations, query analyzer 620 may also rank the search results based on the frequency of the keywords from resource index 610, the amount of traffic to an identified webpage, or other factors.

Memory 604 may include ranking module 624 which is configured to rank search entities 612 and online actions 614 based on their relationships to search query 608. In some implementations, ranking module 624 may use the same or similar functionality as query analyzer 620 to determine the relationship between search entities 612, an entity-action pair, and search query 608. For example, ranking module 624 may determine that one of search entities 612 is a primary search entity based on search query 608 including the name of the primary search entity. Ranking module 624 may also determine whether any of search entities 612 are secondary search entities (e.g., search entities related to the primary search entity). For example, ranking module 624 may identify a search entity for the actor "John Doe" as being related to the search entity for the movie "Sheriff Bob," if the actor appears in the movie. In another example, ranking module 624 may identify a secondary search entity based on how frequently users searched for both the secondary search entity and the primary search entity. Similar to identifying search entities 612 that are related to search query 608, ranking module 624 may determine the relationships between any entity-action pairs for the identified primary or secondary search entities. For example, the primary search entity for "Sheriff Bob" may have a corresponding entity-action pair of {Sheriff Bob, stream}. Ranking module 624 may use the strength of the relationships between the identified search entities and/or identified entity-action pairs, to assign a ranking to them. For example, an entity-action pair of {Sheriff Bob, stream} may receive a high ranking by ranking module 624, if search query 608 is "Sheriff Bob streaming."

Memory 604 may also include result layout module 622, which is configured to determine which search results from query analyzer 620 and which of the ranked search entities 612 or entity-action pairs from ranking module 624 are presented on a search result screen. For example, result layout module 622 may determine that the search result screen is to include a maximum of ten hyperlinks to search results from query analyzer 620. In another example, result layout module 622 may determine that a knowledge panel appearing on the search result screen is to include a maximum number of secondary search entities or third-party content associated with entity-action pairs.

According to various implementations, result layout module 622 is configured to conduct a content auction to identify which of third-party content 618 is to be presented on the search result screen. Result layout module 622 may analyze auction parameters 616 to determine which, if any, third-party content providers are to participate in the content auction. For example, result layout module 622 may allow a third-party content provider to compete in the auction if the provider's auction parameters indicate an entity-action pair that has received a high enough rank by ranking module 624 (e.g., the entity-action pair is sufficiently related to search query 608). In such a case, result layout module 622 may compare bidding parameters in auction parameters 616 from the participating provider, to determine which of third-party content 618 is to be included on the search result screen. Result layout module 622 may also compare quality scores for the third-party content providers and/or third-party content 618 as part of the selection. In some implementations, the content auction may be a second-price auction. In further implementations, result layout module 622 may allow the top n-number of auction participants to include their content on the search result screen based on the type of search entity in the entity-action pair, based on the ranking of the entity-action pair, or other similar factors. In some implementations, a reserve price may be set in the content auction. In such cases, the ranking of the entity-action pair may be lowered if the bidding values used in the auction are below the reserve price and no third-party content for the entity-action pair will be included on the search result screen.

In various implementations, result layout module 622 may also determine the visual layout for any first or third-party content that is to appear on the search result screen. In some implementations, result layout module 622 may generate a knowledge panel for presentation on the search result screen. The knowledge panel may include the primary search entity determined by ranking module 624 and any secondary search entities or third-party content associated with a ranked entity-action pair. In some implementations, result layout module 622 may determine a visual layout that emphasizes certain third-party content based on its corresponding entity-action pair having a relatively high rank. For example, result layout module 622 may use a larger font for the third-party content than for other content on the result screen, may use a highlighting or other visual technique to emphasize the content, or may position the content towards the top of the knowledge panel or result screen. In further implementations, result layout module 622 may determine a visual layout that deemphasizes lower-ranked content from a third-party content provider. For example, the lower ranked content may be positioned further towards the bottom of the search result screen, appear in a smaller font, lack a third-party provider's icon, etc.

Result layout module 622 may provide the search results from query analyzer 620, the primary search entity from ranking module 624, secondary search entities from ranking module 624, and/or any third-party content associated with entity-action pairs ranked by ranking module 624 for presentation on a search result screen. In some implementations, result layout module 622 may generate the search result screen itself as a webpage and provide the search result webpage to a client device via interface 606. In other implementations, result layout module 622 may send data via interface 606 to a stand-alone application on a client device that instructs the application as to where and how the first and third-party content is to be displayed.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of selecting third-party content for presentation with search results comprising:
    maintaining, by a processing circuit, in a database, a plurality of search entities corresponding to named entities in the physical world;
    associating, by the processing circuit, for each search entity of the plurality of search entities stored in the database, one or more online actions corresponding to the search entity with the search entity in the database;
    receiving, at the processing circuit, content placement parameters for a content provider, the content placement parameters including an entity-action pair comprising an online action of the one or more online actions and a search entity of the plurality of search entities;

receiving, from a client device, a search query having one or more keywords;

retrieving search results based on the search query;

determining, by the processing circuit, that the one or more keywords of the search query corresponds to the search entity of the entity-action pair and not to the online action of the entity-action pair;

generating at least one search entity object including an actionable item that is linked to an information resource of the content provider, the actionable item configured to cause the client device to execute a function corresponding to the online action on the information resource of the content provider responsive to an action performed on the actionable item; and providing to the client device, by the processing circuit, a webpage comprising a search result screen that includes the search results, the search entity, and the generated search entity object including the actionable item presented on the search result screen.

2. The method of claim 1, wherein determining the relationship between the one or more keywords of the search query and the entity-action pair comprises:

determining that the one or more keywords correspond to both the search entity and the online action of the entity-action pair.

3. The method of claim 2, further comprising:

generating a visual layout configured to position the third-party content adjacent to the search entity on the search result screen.

4. The method of claim 1, further comprising:

determining a ranking of entity-action pairs for the search entity; and generating a visual layout configured to position the third-party content relative to the search entity according to the ranking.

5. The method of claim 1, further comprising:

determining, by the processing circuit, that the one or more keywords of the search query correspond to a different search entity than the search entity of the entity-action pair;

determining a relationship between the two search entities; and generating a visual layout for the third-party content that includes information regarding the relationship between the two search entities.

6. The method of claim 1, further comprising:

conducting a plurality of content placements using the content placement parameters and in response to receiving a plurality of search requests, wherein the search requests in the plurality comprise different sets of keywords.

7. A system for selecting third-party content for presentation with search results comprising a processing circuit configured to:

maintain, in a database, a plurality of search entities corresponding to named entities in the physical world;

associate, for each search entity of the plurality of search entities stored in the database, one or more online actions corresponding to the search entity with the search entity in the database;

receive content placement parameters for a content provider, the content placement parameters including an entity-action pair that comprises an online action of the one or more online actions and a search entity of the plurality of search entities;

receive a search query having one or more keywords;

retrieve search results based on the search query;

determine that the one or more keywords of the search query corresponds to the search entity of the entity-action pair and not to the online action of the entity-action pair;

generate at least one search entity object including an actionable item that is linked to an information resource of the content provider, the actionable item configured to cause the client device to execute a function corresponding to the online action on the information resource of the content provider responsive to an action performed on the actionable item;

provide to the client device a webpage comprising a search result screen that includes the search results, the search entity, and the generated search entity object including the actionable item presented on the search result screen.

8. The system of claim 7, wherein the processing circuit is configured to determine that the one or more keywords correspond to both the search entity and the online action of the entity-action pair.

9. The system of claim 8, wherein the processing circuit is configured to generate a visual layout configured to position the third-party content adjacent to the search entity on the search result screen.

10. The system of claim 7, wherein the processing circuit is configured to:

determine a ranking of entity-action pairs for the search entity; and generate a visual layout configured to position the third-party content relative to the search entity according to the ranking.

11. The system of claim 7, wherein the processing circuit is configured to:

determine that the one or more keywords of the search query correspond to a different search entity than the search entity of the entity-action pair;

determine a relationship between the two search entities; and generate a visual layout for the third-party content that includes information regarding the relationship between the two search entities.

12. The system of claim 7, wherein the processing circuit is configured to conduct a plurality of content placements using the content placement parameters and in response to receiving a plurality of search requests, wherein the search requests in the plurality comprise different sets of keywords.

13. A non-transitory computer-readable storage medium having machine instructions stored therein, the instructions being executable by a processor to cause the processor to perform operations comprising:

maintaining, in a database, a plurality of search entities corresponding to named entities in the physical world;

associating, for each search entity of the plurality of search entities stored in the database, one or more online actions corresponding to the search entity with the search entity in the database;

receiving content placement parameters for a content provider, the content placement parameters including an entity-action pair that comprises an online action of the one or more online actions and a search entity of the plurality of search entities;

receiving a search query having one or more keywords;

retrieving search results based on the search query;

determining that the one or more keywords of the search query corresponds to the search entity of the entity-action pair and not to the online action of the entity-action pair;

generating at least one search entity object including an actionable item that is linked to an information resource of the content provider, the actionable item configured to cause the client device to execute a function corresponding to the online action on the information resource of the content provider responsive to an action performed on the actionable item;

and providing to the client device a webpage comprising a search result screen that includes the search results, the search entity, and the generated search entity object including the actionable item presented on the search result screen.

14. The computer-readable storage medium of claim 13, wherein determining the relationship between the one or more keywords of the search query and the entity-action pair comprises:

determining that the one or more keywords correspond to both the search entity and the online action of the entity-action pair.

15. The computer-readable storage medium of claim 14, wherein the operations further comprise:

generating a visual layout configured to position the third-party content adjacent to the search entity on the search result screen.

16. The computer-readable storage medium of claim 13, wherein the operations further comprise:

determining a ranking of entity-action pairs for the search entity; and generating a visual layout configured to position the third-party content relative to the search entity according to the ranking.

17. The computer-readable storage medium of claim 13, wherein the operations further comprise:

determining, by the processing circuit, that the one or more keywords of the search query correspond to a different search entity than the search entity of the entity-action pair;

determining a relationship between the two search entities; and generating a visual layout for the third-party content that includes information regarding the relationship between the two search entities.

18. The computer-readable storage medium of claim 13, wherein the operations further comprise:

conducting a plurality of content placements using the content placement parameters and in response to receiving a plurality of search requests, wherein the search requests in the plurality comprise different sets of keywords.

* * * * *